C. W. LARSON.
ELECTRIC TOWING LOCOMOTIVE.
APPLICATION FILED JULY 29, 1915.
1,177,422.
Patented Mar. 28, 1916.
4 SHEETS—SHEET 1.
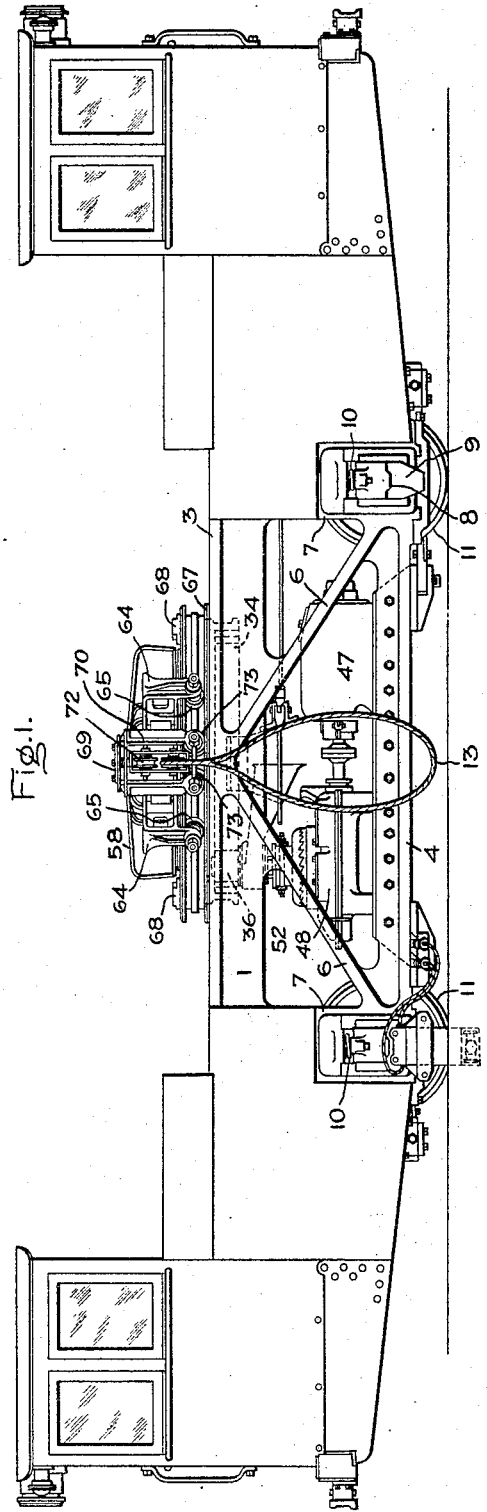
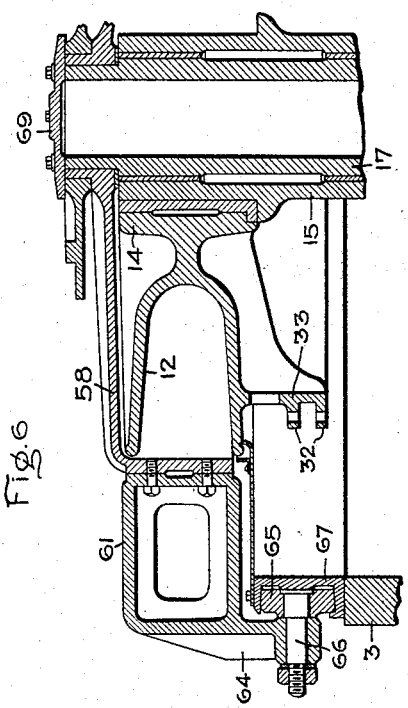
Inventor:
Carl W. Larson,
by Albert G. Davis
His Attorney.

C. W. LARSON.
ELECTRIC TOWING LOCOMOTIVE.
APPLICATION FILED JULY 29, 1915.
1,177,422.
Patented Mar. 28, 1916.
4 SHEETS—SHEET 2.
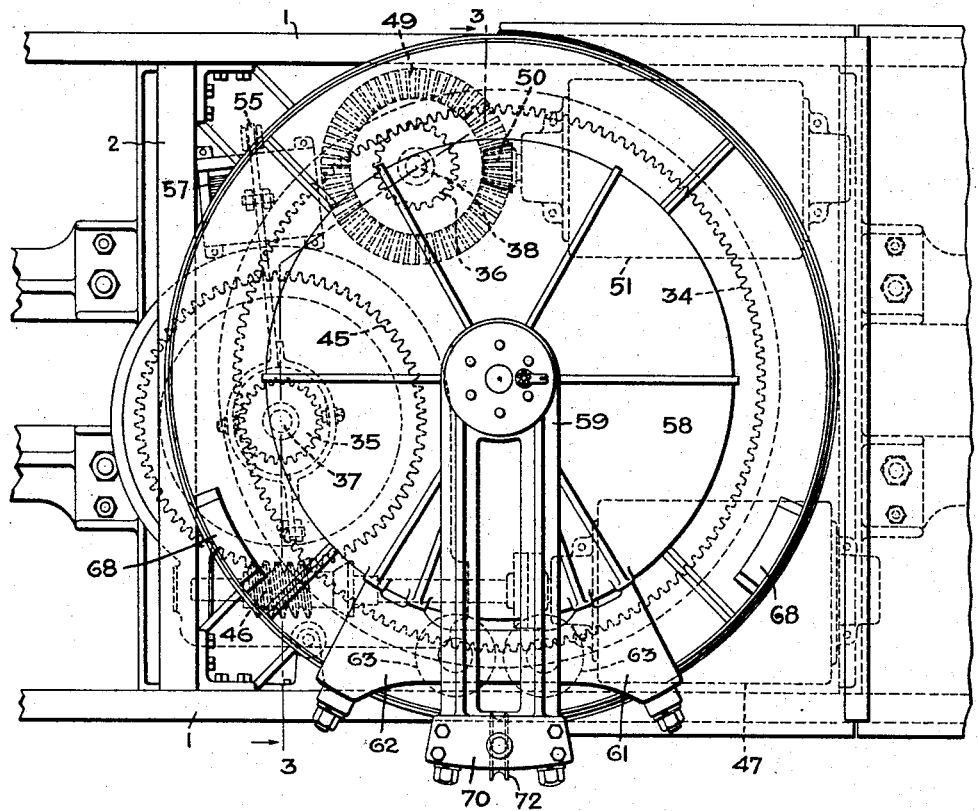
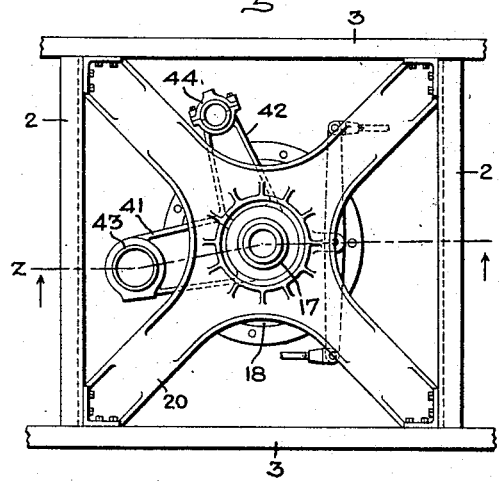
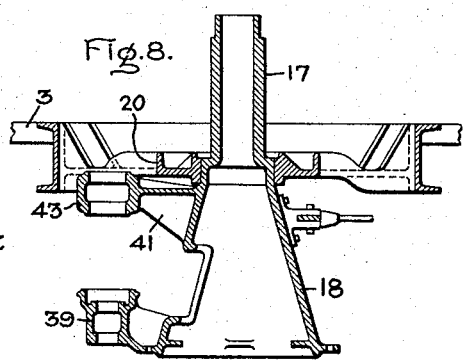
Inventor:
Carl W Larson,
by Albert G. Davis
His Attorney.

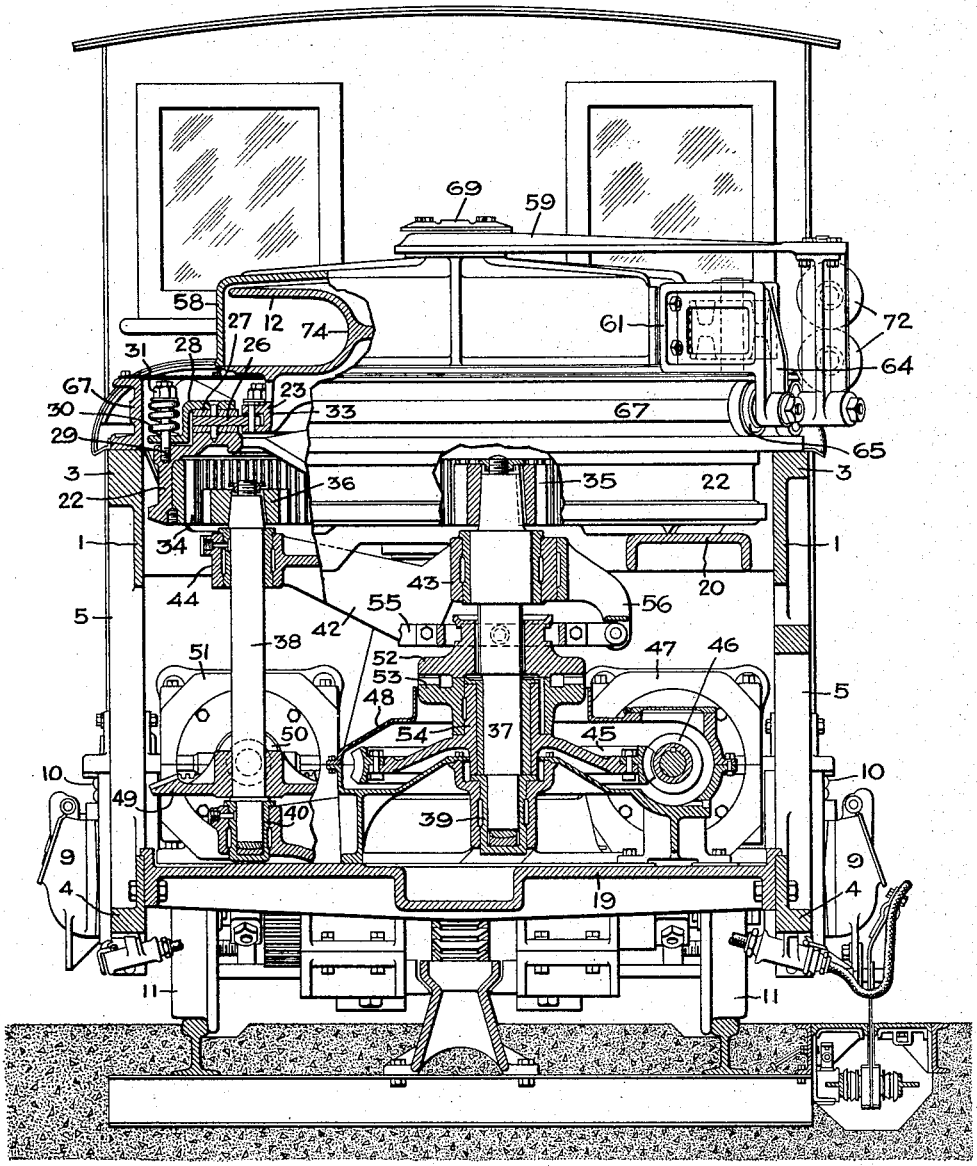

C. W. LARSON.
ELECTRIC TOWING LOCOMOTIVE.
APPLICATION FILED JULY 29, 1915.
1,177,422.
Patented Mar. 28, 1916.
4 SHEETS—SHEET 4.
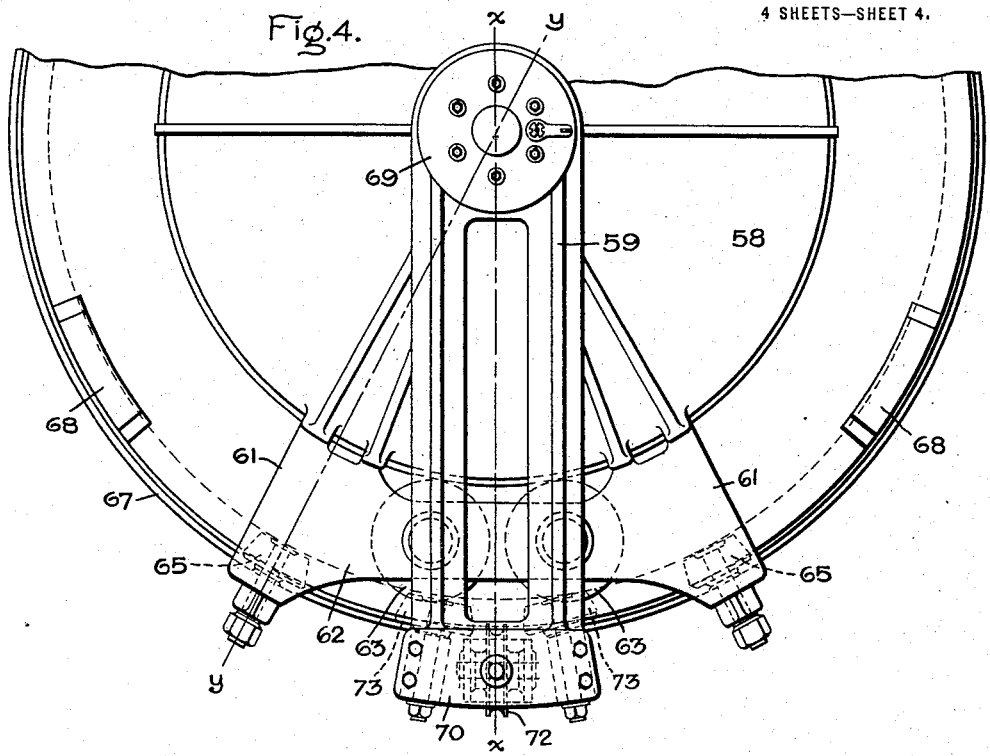
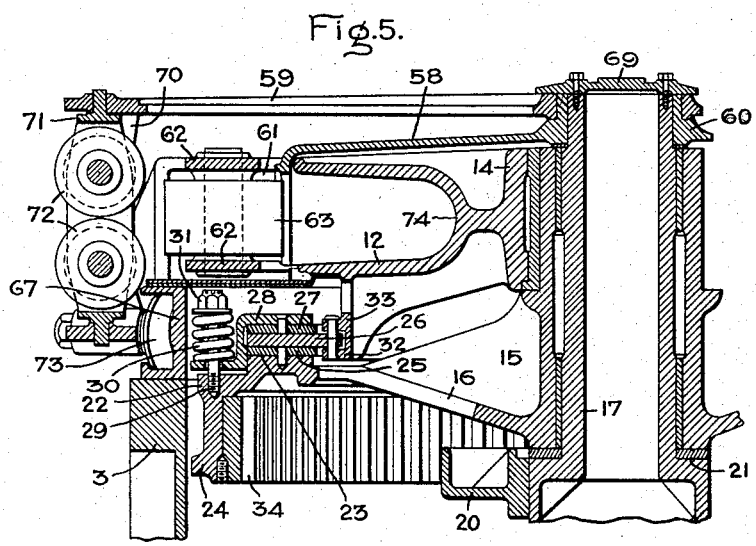
Inventor:
Carl W. Larson,
by Albert G. Davis
His Attorney.

UNITED STATES PATENT OFFICE.

CARL W. LARSON, OF ERIE, PENNSYLVANIA, ASSIGNOR TO GENERAL ELECTRIC COMPANY, A CORPORATION OF NEW YORK.

ELECTRIC TOWING-LOCOMOTIVE.

1,177,422. Specification of Letters Patent. Patented Mar. 28, 1916.

Original application filed October 28, 1914, Serial No. 869,001. Divided and this application filed July 29, 1915. Serial No. 42,550.

*To all whom it may concern:*

Be it known that I, CARL W. LARSON, a citizen of the United States, residing at Erie, in the county of Erie, State of Pennsylvania, have invented certain new and useful Improvements in Electric Towing-Locomotives, of which the following is a specification.

This invention relates to electric locomotives, and especially to those which are used for towing vessels, or for similar service in which the tractive effort of the motors is exerted through a cable wound upon a drum mounted upon the locomotive.

My invention comprises various improvements in the drum operating mechanism, and the rope guides therefor, all as hereinafter set forth and claimed.

The present application constitutes a division of my pending application filed October 28, 1914, Serial No. 869,001.

The locomotive which I have illustrated in the accompanying drawings has been designed and built for service at the Panama Canal for towing vessels into and through the locks; but it is evidently capable of other cognate uses, such for instance, as pulling trains up heavy grades, etc. The system of towing adopted at the Panama Canal locks utilizes for each vessel four locomotives running along the canal walls, two being opposite each other in advance of the vessel, and two running opposite each other to follow the vessel. Cables extend from the forward locomotives and connect with the port and starboard sides respectively of the vessel near the bow, and other cables connect the rear locomotives with the port and starboard quarters of the vessel.

The lengths of the towing cables are adjusted to position the vessel substantially in mid-channel, and when the leading locomotives are started they will tow the vessel, while the trailing locomotives will follow; the speed of all the locomotives being practically the same. Moreover, the towing cables can be adjusted at will during the tow. Thus the vessel is always under complete control quite independently of its own power and the danger of injury to the canal walls and gates is reduced to a minimum. In order to stop the tow, the power is shut off, the forward locomotives drifting and the hand brakes on the trailing locomotives being applied, thus retarding the vessel until it comes to a stop. For such service, the locomotive must have a low center of gravity to reduce the danger of being upset by the lateral pull of the cable. It must have means for slowly paying out or taking in the towing cable during maneuvering and control of the vessel, and means for quickly hauling in the cable when it has been cast off. It must have yielding couplings for the winding drum which will give to prevent the cable from parting in case of an excessive strain. It must have well designed and flexible guiding devices to accommodate for the various angles of the cable. My invention aims to provide for all these requirements.

In the accompanying drawings, Figure 1 is a side elevation of my improved towing locomotive with some of the side plates removed; Fig. 2 is a plan view of the middle portion of the same on a larger scale: Fig. 3 is a cross-section on the line 3—3; Fig. 2, certain parts being broken away; Fig. 4 is a plan view of the cable guiding devices; Fig. 5 is a cross-section of the same on the line $x$—$x$, Fig. 4; Fig. 6 is another cross-section of the same on the line $y$—$y$, Fig. 4; Fig. 7 is a plan view of the pedestal and brace on a smaller scale, and Fig. 8 is a vertical section of the same on the line $z$—$z$, Fig. 7.

The working parts of the locomotive are supported by two longitudinal upright side frames 1 of cast steel connected by transverse beams 2. The frames are in effect deep rigid trusses, having upper and lower members 3, 4 connected by posts 5 and diagonal braces 6. The middle portion of each frame has its upper and lower members parallel and horizontal, but the end portions have their lower members inclined upwardly toward the ends of the frame. The pedestals 7 for the wheel axles 8 are located at the junction of these end portions with the middle portion, and are of the usual locomotive type, having vertical parallel jaws between which slide the journal boxes 9. Springs 10 are interposed between the tops of the journal boxes and the tops of the pedestals. The locomotive is thus mounted upon four wheels 11 carried on the two axles 8, the wheel base being, in the locomotive selected for illustration, about twelve feet, and the overall length of the locomotive over thirty-two feet.

Each axle is driven by its own motor, independently of the other, the construction being identical at both ends of the machine. The two motors are controlled by suitable controllers installed in the cabs at the ends of the locomotive, and the circuits are such that both motors can be controlled from either cab, and can be operated in series or in multiple as desired. Current may be taken from a working conductor by any kind of current collecting device, such as the plow shown in Figs. 1 and 3. Inasmuch as these electrical features form no part of my invention, I have not deemed it necessary to describe them in detail.

Passing now to the features which render the locomotive peculiarly adapted for towing purposes, it will be observed that the drum 12 on which the cable 13 is wound is located midway between the ends of the locomotive and above the upper member 3 of the side frames, so that the cable can be led off on either side of the machine and through a wide range of angles to the line of travel. The hub 14 of the drum is rotatably mounted upon the hub 15 of the spider 16 which in turn is rotatable upon the upper portion of a massive, tubular, vertical cylindrical column 17 rising from a pedestal 18 secured to the base plate 19 which is supported upon the lower members 4 of the side frames. The upper portion of the pedestal is held in a brace 20 which is shown as a heavy X-shaped casting fastened to the upper members 3 of the side frames and to two of the cross-beams 2. This brace fits the pedestal just below the shoulder 21 on which the hub 15 is stepped.

The spider 16 supports a circular rim 22 which has a horizontal upper surface 23 and a dependent flange 24. On the surface 23 is secured a flat, smooth bronze ring 25, on which lies a smooth flat ring 26 of steel. A second bronze ring 27, similar to the first, lies on top of the steel ring and is secured to a flanged follower 28. Studs 29 project up from the rim 22 through holes in a horizontal flange of the follower and are encircled by springs 30 which abut between said flange and nuts 31 on the studs and press all three rings tightly together. The steel ring 26 is secured to lugs 32 on a flange 33 projecting downwardly from the winding drum 12, so that the rings constitute a friction clutch between the spider and the drum.

Inside the flange 24 on the spider is secured a large internal gear 34, with which mesh two driving pinions 35, 36, secured respectively to two upright shafts 37, 38. Step bearings 39, 40 are provided for these shafts in the base of the pedestal 18, while arms 41, 42, projecting from the upper portion of the pedestal just below the brace 20 afford guide bearings 43, 44 for the upper portions of said shafts. A worm gear 45 is clutched to the shaft 37 and is driven by a worm 46 on the shaft of an electric motor 47 bolted to the base 19 of the locomotive. This gearing is inclosed by a casing 48. A bevel gear 49 is keyed to the upright shaft 38 and meshes with a bevel pinion 50 on the shaft of an electric motor 51 fastened to the base 19.

The motor 51 is used for driving the drum at a fast rate of speed for coiling in or paying out cable. It remains permanently in gear. The other motor, 47, is used for taking in or paying out cable when it is under load, and the drum operates as a windlass or capstan. It operates much more slowly and powerfully than the motor 51, and can be disconnected from its shaft when not in use. To this end, a clutch is provided, having one member 52 splined to the shaft 37, and the other member 53 attached to the hub 54 of the worm gear, which is sleeved on the shaft. A lever 55, fulcrumed to a lug 56 on the arm 41, is pivotally connected to the hub of the clutch member 52, and its other end is attached to the movable core of a solenoid 57 which is in circuit with the motor 51, so that whenever the circuit of the latter is closed the solenoid will lift its core and the lever 55, and thus throw out the clutch of the slow winding motor, allowing shaft 37 to revolve, but motor 47 and worm gear 45 remaining at rest.

The cable guide which directs the cable as it pays out or winds up is mounted to revolve on the axis of the drum. It comprises two angularly adjustable portions 58, 59, the former being a circular bell which serves as a cover or cable guard for the winding drum. The hub 60 of the bell is journaled on the upper end of the column 17, being stepped on a shoulder thereon. At one side the bell is cut away to admit the cable to the drum. On each side of this opening is bolted one end of a frame, comprising boxlike ends 61 connected by two parallel bars 62, one above and the other below said opening. Between said bars and on either side of the opening are two upright guide rolls 63 having cylindrical faces, and rotating on journals received in bearings in the bars 62. At each end of this frame, arms 64 extend downwardly to afford supports for two rollers 65 mounted on horizontal studs 66 secured in said arms. These rollers are adapted to travel between the upper and lower flanges of a circular channel iron 67 which has its web extending vertically and which is fastened on top of the side frames concentric with the column 17, and forms a track supporting the outer end of the frame 61, 62, and relieving the column 17 of the weight thereof. Stops 68 are removably attached to the top of the channel iron 67 to limit the angular play of the guide member 58. By taking off these stops, the bell can be turned until the rolls 63 are on the opposite side of the locomotive; after which the stops can be secured on that side to limit the movement of the bell. The other guide member 59 is a radial casting having one end turning freely on the hub of the member 58. A cap 69, removably secured to the top of the column 17, protects the joint and prevents the guide members from accidentally coming off. The outer end of the member 59 is an upright rectangular frame 70 in whose top and bottom is journaled on a vertical axis a swivel 71 carrying two grooved rolls 72, journaled one above the other on horizontal axes. The edges of these rolls stand close together, so that their grooves form an opening through which the cable 13 passes, about on a line with the middle of the guide rolls 63. The frame 70 is supported by rollers 73 running in the track 67. The guide member 59 has an angular movement with reference to the member 58, limited by the frame 70 striking the ends of the frame 61. When the cable is pulled either forward or backward from the middle position it occupies in Fig. 1, the swivel permits the grooved rolls 72 to move with it, and the guide member 59 swings also, so that the rolls 72 continue to support the rope on a line with the middle of the rolls 63, without being themselves subjected to any side strain. All lateral strains are sustained by the heavy guide rolls 63; the cable moving up and down between them as it winds on the drum. It will be observed that the latter is in the form of a deeply grooved wheel, the groove 74 being U-shaped. It is found that the cable lays itself up in a solid regular coil in this groove, so that it can withstand a heavy pull without jamming.

This locomotive has a number of features which have made it a practical success. It is constructed on accepted lines of locomotive practice. The parts are all simple and sturdy and designed to meet and sustain heavy duty. Each propelling motor and its gearing is so mounted as to insure smooth and easy running. The controlling mechanism, both mechanical and electrical, is duplicated in the two cabs, so that the locomotive can be handled from either end. The winding drum and guide members are on top of the locomotive in full view from both cabs. The friction rings which constitute the clutch between the driving spider and the cable drum, are machined and ground to a smooth fit, and by means of the compression springs they can be set to slip at any desired load on the cable up to the breaking strain of the same. When adjusted for a given load, the drum can be relied upon to slip within five per cent. of that load. This always will prevent the cable from breaking as the strain is limited by this device. This device is also necessary when a tow is too heavy to be accelerated at locomotive speed, and it allows the cable to slip out until the speed of the tow increases to that of the locomotive.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. An electric towing locomotive having deep side frames connected by cross beams, a vertical winding drum rotatable above said frames, a circular channel iron concentric with said winding drum and having its web extending vertically, a cable guide member pivoted concentric with said drum, and rollers on said member adapted to travel between the upper and lower flanges of said channel iron.

2. An electric towing locomotive having a rigid frame, a vertical winding drum above said frame, a bell covering said drum and rotatable on the same axis, a frame secured to said bell and carrying upright guide rolls, a circular track concentric with said drum, and rollers on said last named frame running on said track.

3. An electric towing locomotive having a rigid frame, a vertical winding drum above said frame, a circular track concentric with said drum, and two cable guiding members independently pivoted concentric with said drum and supported on said track, one carrying upright guide rolls and the other horizontal guide rolls.

4. An electric towing locomotive having a rigid frame, a vertical winding drum above said frame, a circular track concentric with said drum, and two cable guiding members independently pivoted concentric with said drum and supported on said track, one carrying upright guide rolls and the other horizontal grooved guide rolls in line with the upright rolls.

5. An electric towing locomotive having a rigid frame, a vertical winding drum above said frame, two cable guiding members independently pivoted concentric with said drum, upright cylindrical guide rolls on one member, a swivel mounted in the other member in front of the guide rolls and turning on a vertical axis, and horizontal grooved rolls journaled in said swivel.

6. An electric towing locomotive, having a rigid frame, a column rising above the same, a winding drum rotatably supported by said column, a circular channel iron concentric with said column, a bell rotatably mounted on said column and inclosing said drum, a frame comprising end portions secured to said bell and bars connecting said end portions, upright guide rolls carried by said bars, said end portions having downward extensions, and rollers carried by said downward extensions of said end portions and engaging said channel iron.

7. An electric towing locomotive having a rigid frame, a pedestal carried thereby and having an upright column, a spider and a winding drum rotatably supported by said column, friction devices for coupling said spider and drum, gear teeth secured to said spider, and two motors geared thereto for driving said spider at different speeds, the faster for coiling and the slower for winding.

8. An electric towing locomotive having a rigid frame, a pedestal carried thereby and having an upright column, a spider and a winding drum rotatably supported by said column, friction devices for coupling said spider and drum, gear teeth secured to said spider, two motors geared thereto for driving said spider at different speeds, the faster for coiling and the slower for winding, and a clutch for disconnecting the slow speed or windlass motor.

9. An electric towing locomotive having a rigid frame, a pedestal carried thereby and having an upright column, a spider and a winding drum rotatably supported by said column, friction devices for coupling said spider and drum, gear teeth secured to said spider, two motors geared thereto for driving said spider at different speeds, the faster for coiling and the slower for winding, a clutch for disconnecting the slow speed or windlass motor, and a solenoid in circuit with the coiling motor for opening said clutch when said coiling motor is energized.

In witness whereof, I have hereunto set my hand this 27th day of July, 1915.

CARL W. LARSON.